Patented July 25, 1950

2,516,307

UNITED STATES PATENT OFFICE 2,516,307

VINYL RESINS PLASTICIZED WITH CYANO ESTERS

Don E. Floyd, Minneapolis, Minn., assignor to General Mills, Inc., a corporation of Delaware No Drawing. Application January 6, 1949, Serial No. 69,600

4 Claims. (Cl. 260—31.8)

The present invention relates to plasticized polyvinyl resin compositions. Polyvinyl resins are generally too hard and rigid to be used for many purposes without a plasticizer. It is usually necessary to add a plasticizer to make the resins soft, pliable, and capable of being milled into strong pliable sheets or films. It is also necessary that the plasticized resin composition have excellent heat stability, suppleness, and elasticity. In order for material to act as a plasticizer, it is necessary that it be compatible with the resin and not exude or sweat out leaving the resin unplasticized.

There have been found very few plasticizers which are really satisfactory for this purpose. The esters of dibasic acids such as phthalic and sebacic acids, and particularly esters such as the di-2-ethylhexyl esters, commonly known as dioctyl phthalate and dioctyl sebacate, have been used most widely for plasticizing of these resins. Unless an ester of such a high molecular weight is employed, the plasticizers are of too low a molecular weight and are, therefore, too volatile for many uses. The plasticizers which possess the requisite properties of being non-volatile and of having the ability to give flexibility at low temperature, and some measure of stability against heat discoloration are quite limited in number.

It has now been found that compounds having the following formula are excellent plasticizers for polyvinyl resins:

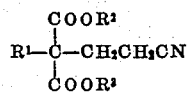

where $R^1$ is an aliphatic hydrocarbon group containing from ten to sixteen carbon atoms, $R^2$ and $R^3$ are aliphatic hydrocarbon groups containing from one to eight carbon atoms. These compounds are usually prepared relatively inexpensively and confer excellent heat stability, low temperature flexibility, suppleness, and elasticity to vinyl resins containing them as plasticizers.

It is, therefore, an object of the present invention to provide plasticized polyvinyl resin compositions containing compounds having the above formula.

The invention is applicable to polyvinyl resins in general, and particularly to the polyvinyl esters such as polyvinyl chloride, polyvinyl acetate, vinyl chloride-vinyl acetate copolymers, and vinyl chloride-vinylidene chloride copolymers.

The plasticizing agents employed in the present invention may be of a wide variety coming within the above general formula. $R^1$ may contain from ten to sixteen carbon atoms and may be saturated or unsaturated, although the saturated compounds are preferred in view of their increased stability. Furthermore, as will be seen more fully hereinafter, in view of the manner in which these compounds are preferably formed, the plasticizer may be composed of a mixture of compounds having the above formula. $R^2$ and $R^3$ likewise are subject to variation and may be methyl, ethyl, isobutyl, n-hexyl, etc. Moreover, they may be alike or different. Similarly, in view of the manner of preparing these compounds, it is preferred that the groups $R^2$ and $R^3$ may be methyl or ethyl or mixtures of these groups.

The plasticizers described herein may be used alone or in conjunction with other plasticizers. The relative proportions of compounds used and the total amount of plasticizers used are dependent upon the effects which are desired. In most of the tests described herein the weight of the plasticizer used amounts to approximately 35% of the total weight of the plasticized resin. This quantity was used in order to permit direct comparison of the plasticizing effect of the various compounds. The plasticizers are compatible with the resins in amounts ranging from to 5% to at least 50% of plasticizer based on the total weight of the plasticized composition. A definitely noticeable softening effect is observed at as low a concentration of plasticizer as 5%.

In the examples given hereinafter various polyvinyl resins were mixed with the plasticizers indicated, usually by milling for a short time on steam-heated rolls, sheeted and molded with heat and pressure to afford suitable test sheets. The tests for compatibility (sweat-out or exudation of plasticizer), for heat stability, and for minimum flex. temperatures were those described by M. C. Reed in Ind. Eng. Chem. 35, 896 (1943). The test for elongation at 1000 pounds per square inch was made on a suitably shaped strip in a Scott tester which applied one thousand pounds per square inch to a sample in 55 seconds. The amount of elongation is given as the direct measure of the plasticizer efficiency for comparative purposes at a definite plasticizer level. The greater the elongation, the more efficient the plasticizer at room temperature at which this test was made.

The plasticizers described herein may be prepared as described in my copending application Serial No. 778,045, filed October 4, 1947, entitled Cyano Esters, by the addition reaction of an appropriate aliphatic substituted malonic ester with acrylonitrile. The aliphatic substituted malonic ester may be prepared by the process described in my copending application Serial No. 596,811, filed May 30, 1945, and entitled Ester Condensation, or may be prepared by other methods known in the literature. According to said ester condensation application, the aliphatic substituted malonic esters may be prepared by reacting a monohydric alcohol ester of a higher fatty acid with an oxalate ester to form an oxalyl derivative and thereafter decarbonylating the oxalyl derivative to produce the substituted malonic ester. Since oxalate esters are more conveniently available in the form of ethyl esters, and since esters of higher fatty acids are more conveniently available as methyl esters, it will be appreciated that the most desirable commercial method of producing these substituted malonic esters will result in a mixture of malonic esters in which the ester groups are most likely mixed methyl and ethyl esters together with minor amounts of substituted methyl malonate and substituted ethyl malonate.

The production of the cyanoesters from the substituted malonic esters involves the reaction of the substituted malonic esters with acrylonitrile in the presence of an alkaline catalyst such as alkali metals, their hydrides, alkoxides, and other similar basic substances. This reaction necessitates only a relatively small amount of catalyst and usually it is preferred to use a molar ratio of 0.02 to 0.1 of catalyst. This reaction is preferably carried out in the presence of a solvent which may be any of a variety of solvents, preferably aliphatic alcohols, aromatic hydrocarbons, or certain mixtures thereof.

Considerable heat is evolved during the addition reaction, and the temperature should be controlled as, for example, by means of a cooling bath or by the slow addition of the reagents, thus preventing the reaction from becoming too violent. Moreover, when aromatic hydrocarbon solvents are employed, considerable acrylonitrile polymer is formed if the temperature is allowed to rise above 40° C. There does not appear to be any such tendency when alcohol is the solvent. In general, it is preferred to operate between room temperature and the boiling point of acrylonitrile.

The ratio of reactants is subject to considerable variation. Either reactant may be used in excess. It is preferred, however, to use a slight excess of acrylonitrile in view of the low cost, ease of removal and favorable effect on the yield. It is more difficult to separate and remove an excess of substituted malonic ester due to the relatively high boiling point.

The reaction products are colorless, slightly viscous liquids and have faint, pleasant odors. They are high-boiling and have low volatilities at room temperature. All of the addition products possess two carbalkoxyl groups, one cyano group, and a long carbon chain. These groups contribute to the solubilizing properties and tend to make the adducts compatible with a wide range of substances. The high boiling points, low volatilities, presence of solubilizing groups, faint and pleasant odors, and lack of color make these compounds valuable for use as plasticizers.

The following examples will serve to illustrate the invention:

Example 1

Two hundred grams of diethyl decylmalonate were dissolved in 150 ml. of absolute ethanol containing 0.4 g. of dissolved sodium. To this solution was added slowly and with stirring 53 g. of acrylonitrile. The temperature was kept at 70° C. or lower by controlling the rate of addition. After all of the acrylonitrile had been added, the mixture was allowed to stand for one hour.

The catalyst was neutralized by the addition of acetic acid and the ethanol used as solvent was evaporated from the reaction mixture under reduced pressure. The residual oil was dissolved in ether and the solution was washed with water and dried over sodium sulfate. The ether was distilled off and the remaining product was subjected to vacuum distillation. The portion boiling at 155–158° C./0.15 mm. was collected. It weighed 210.3 g. A slight residue was left in the distilling flask.

The analytical specimen obtained by fractional distillation boiled at 145–147° C./0.1 mm. The $n_D^{25}$ was 1.4482.

Calcd.: N, 3.96%. Found: N, 3.75%.

The following dry, solid mixture was finely powdered and well blended:

| | Parts |
|---|---|
| Basic lead carbonate | 1 |
| Stearic acid | 0.5 |
| Copolymer of 95% vinyl chloride and 5% vinyl acetate marketed as VYNW resin | 63.5 |

To this dry mixture was added 35 parts of 1-cyano-3,3-dicarbethoxytridecane prepared as described above. The liquid was allowed to penetrate into the porous solid mixture on standing. The resulting mixture was blended on a rubber mill heated by 50 pounds steam pressure for about four minutes to give a continuous film of about 0.06 to 0.07 inch thickness. Portions of this sheet were molded at 150–160° C. under pressure of 1,000 p. s. i. for two minutes to give films approximately 0.02 and 0.04 inch thick. Tests similar to those described by Reed (Ind. Eng. Chem. 35, 896, (1943)) were applied to portions of these sheets. The test results are summarized below.

| | |
|---|---|
| Minimum flex temperature | −26° C. |
| Elongation | 120% |
| Heat stability at 160° C. | 4 hours |
| Compatibility | Excellent |
| Sweating out | None |

The characteristics of a similar plasticized film containing the same amount of di-2-ethylhexyl phthalate (DOP) as plasticizer were:

| | |
|---|---|
| Minimum flex temperature | −24° C. |
| Elongation | 91% |
| Heat stability at 160° C. | 3–4 hours |
| Compatibility | Good |
| Sweating out | None |

The characteristics of a similar plasticized film containing the same amount of tricresyl phosphate were:

| | |
|---|---|
| Minimum flex temperature | +0.5° C. |
| Elongation | about 80% |
| Heat stability at 160° C. | 2 hours |
| Compatibility | Fair |
| Sweating out | None |

This material had an obnoxious odor during processing.

Example 2

Thirty-two and eight-tenths grams (0.1 mole) of diethyl dodecylmalonate was dissolved in 30 ml. of benzene and 0.05 g. of metallic sodium was added to the solution. Then 6.4 g. (0.1 mole plus 20% excess) of acrylonitrile was added slowly and with stirring. The temperature of the reaction mixture was maintained at 30–40° C. by means of a cold water bath. No acrylonitrile polymer formation was noted.

The solution was neutralized with acetic acid, washed with water and dried over sodium sulfate. The benzene was distilled off and the remaining product distilled under reduced pressure. There was collected 35.1 g. of colorless distillate, boiling at 167–168° C./0.08 mm. The $n_D^{25}$ was 1.4491.

Calcd.: N, 3.67%. Found: N, 3.50%.

The dry mixture composed of one part basic lead carbonate, 0.5 part stearic acid and 63.5 parts of VYNW resin was blended as in Example 1. To it was added 35 parts of 1-cyano-3,3-dicarbethoxypentadecane prepared as above. The mixture was processed on a rubber mill and portions of the film produced were molded under heat and pressure. The processing and testing of this plasticized resin were conducted as in the previous example. The test results are shown below.

Minimum flex temperature _____ −30° C.
Elongation _____ 112%
Heat stability at 160° C. _____ 3 hours
Compatability _____ Excellent
Sweating out _____ None

Example 3

A dry mixture of one part basic lead carbonate, 0.5 part stearic acid and 63.5 parts of polyvinyl chloride (Geon Resin 101) was prepared. To it was added 35 parts of 1-cyano-3,3-dicarbalkoxypentadecane (in which the alkoxy groups were mixtures of methoxy and ethoxy in approximately equal amounts).

The test results obtained after milling and processing were:

Minimum flex temperature _____ −20° C.
Elongation _____ 85%
Heat stability at 160° C. _____ 3–4 hours
Compatibility _____ Good
Sweating out _____ None Similar tests were conducted using the same resin and di-2-ethylhexyl phthalate as plasticizer.

Minimum flex temperature _____ −18° C.
Elongation _____ 77%
Heat stability at 160° C. _____ 4 hours
Compatibility _____ Good
Sweating out _____ None

Example 4

The resin mixture described in Example 3 was prepared again, but different ratios of plasticizers were used. To 95 parts of the dry polyvinyl chloride resin mixture was added 5 parts of plasticizer in each case. The plasticizers tested were 1-cyano-3,3-dicarbethoxypentadecane and di-2-ethylhexyl phthalate. The mixtures were milled, but not molded. Both gave continuous films.

The film containing the 1-cyano-3,3-dicarbethoxypentadecane was more pliable and less brittle than that containing the di-2-ethylhexyl phthalate.

Example 5

A dry mixture composed of one part basic lead carbonate, 0.5 part stearic acid and 63.5 parts of a vinyl chloride-vinylidene chloride copolymer (Geon Resin 202) was prepared. To 50 parts of this dry mixture was added 50 parts of 1-cyano-3,3-dicarbalkoxypentadecane (in which the alkoxy groups were mixtures of methoxy and ethoxy in approximately equal amounts). The mixture was milled and processed to give a tough, pliable film. The results of the plasticizer tests are shown below:

Minimum flex temperature _____ −47° C.
Elongation _____ 284%
Heat stability at 160° C. _____ 3–4 hours
Compatibility _____ Excellent
Sweating out _____ None Similar tests were conducted using di-2-ethylhexyl phthalate as plasticizer. The results of these tests were:

Minimum flex temperature _____ −39° C.
Elongation _____ 277%
Heat stability at 160° C. _____ 4 hours
Compatibility _____ Excellent
Sweating out _____ None

Example 6

The dry resin mixture containing vinyl chloride-vinylidene chloride copolymer (Geon Resin 202) was used again. To 65 parts of this mixture was added 35 parts of 1-cyano-3,3-dicarbethoxytridecane. The mixture was processed and tested as in the other examples.

Minimum flex temperature _____ −30° C.
Elongation _____ 184%
Heat stability at 160° C. _____ 4 hours
Compatibility _____ Excellent
Sweating out _____ None Similar tests using the same ratio of components but substituting di-2-ethylhexyl phthalate as plasticizer gave these results:

Minimum flex temperature _____ −26° C.
Elongation _____ 183%
Heat stability at 160° C. _____ 4 hours
Compatibility _____ Excellent
Sweating out _____ None

Example 7

The following solutions were prepared:

I

| | Parts |
|---|---|
| Polyvinyl acetate (Carbide and Carbon AYAF) | 2 |
| 1-cyano-3,3-dicarbalkoxypentadecane (the same plasticizer as in Example 3) | 1 |
| Ethylene dichloride | 27 |

II

| | Parts |
|---|---|
| Polyvinyl acetate (Carbide and Carbon AYAF) | 2 |
| Di-2-ethylhexyl phthalate | 1 |
| Ethylene dichloride | 27 |

Films were cast on glass plates from each of these solutions and allowed to air-dry at room temperature overnight. The film from Solution I was clear, colorless, tough and elastic. The film from Solution II was slightly cloudy, but tough and elastic.

The preferred plasticizers of the present invention are the 1-cyano-3,3-dicarbalkoxy-tridecanes and -pentadecanes. The alkoxy groups are preferably methoxy and ethoxy groups or mixtures thereof.

While numerous modifications of the invention have been described, other modifications are also possible without departing from the spirit of the invention.

I claim as my invention:

1. A polyvinyl resin composition plasticized with a compound having the following formula:

$$\begin{array}{c} COOR^2 \\ R^1-C-CH_2CH_2CN \\ COOR^3 \end{array}$$

where $R^1$ is an aliphatic hydrocarbon group containing from ten to sixteen carbon atoms, $R^2$ and $R^3$ are aliphatic hydrocarbon groups containing from one to eight carbon atoms.

2. A polyvinyl chloride resin composition plasticized with a compound having the following formula:

$$\begin{array}{c} COOR^2 \\ C_{12}H_{25}-C-CH_2CH_2CN \\ COOR^3 \end{array}$$

where $R^2$ and $R^3$ are alkyl groups containing not more than two carbon atoms.

3. A vinyl chloride-vinyl acetate copolymer plasticized with a compound having the following formula:

$$\begin{array}{c} COOR^2 \\ C_{12}H_{25}-C-CH_2CH_2CN \\ COOR^3 \end{array}$$

where $R^2$ and $R^3$ are alkyl groups containing not more than two carbon atoms.

4. A vinyl chloride-vinylidene chloride copolymer plasticized with a compound having the following formula:

$$\begin{array}{c} COOR^2 \\ C_{12}H_{25}-C-CH_2CH_2CN \\ COOR^3 \end{array}$$

where $R^2$ and $R^3$ are alkyl groups containing not more than two carbon atoms.

DON E. FLOYD.

No references cited.